(12) United States Patent
Suzuka

(10) Patent No.: US 8,773,762 B2
(45) Date of Patent: Jul. 8, 2014

(54) LENS BARREL HAVING AN IMAGE-STABILIZING INSERTABLE/REMOVABLE OPTICAL ELEMENT

(75) Inventor: Shinya Suzuka, Saitama (JP)

(73) Assignee: Hoya Corporation, Tokyo (JP)

( * ) Notice: Subject to any disclaimer, the term of this patent is extended or adjusted under 35 U.S.C. 154(b) by 123 days.

(21) Appl. No.: 13/372,969

(22) Filed: Feb. 14, 2012

(65) Prior Publication Data

US 2012/0218636 A1   Aug. 30, 2012

(30) Foreign Application Priority Data

Feb. 28, 2011  (JP) ................................ 2011-042027
Mar. 24, 2011  (JP) ................................ 2011-065804

(51) Int. Cl.
| G02B 27/64 | (2006.01) |
| G02B 7/02 | (2006.01) |
| G03B 17/00 | (2006.01) |
| G03B 5/06 | (2006.01) |
| H04N 5/228 | (2006.01) |
| G03B 17/04 | (2006.01) |
| H04N 5/232 | (2006.01) |

(52) U.S. Cl.
CPC .............. *G02B 27/646* (2013.01); *G03B 5/06* (2013.01); *G03B 17/04* (2013.01); *H04N 5/23287* (2013.01)
USPC ........ 359/557; 359/813; 348/208.11; 396/55; 396/350

(58) Field of Classification Search
USPC ............ 359/554–557, 813; 396/52–55, 350; 348/208.99, 208.1–208.16
See application file for complete search history.

(56) References Cited

U.S. PATENT DOCUMENTS

| 7,619,654 B2 * | 11/2009 | Ito et al. ................... 348/208.12 |
| 8,090,249 B2 * | 1/2012 | Suzuka ........................... 396/55 |
| 8,121,467 B2 * | 2/2012 | Suzuka ........................... 396/55 |
| 8,396,358 B2 * | 3/2013 | Suzuka ........................... 396/55 |
| 8,422,874 B2 * | 4/2013 | Suzuka ........................... 396/55 |
| 8,498,528 B2 * | 7/2013 | Suzuka ........................... 396/55 |
| 2007/0183764 A1 * | 8/2007 | Imura et al. ..................... 396/55 |
| 2008/0219653 A1 * | 9/2008 | Shioda ........................... 396/55 |

FOREIGN PATENT DOCUMENTS

JP   2007-101993   4/2007

OTHER PUBLICATIONS

U.S. Appl. No. 13/352,564 to Shinya Suzuka, filed Jan. 18, 2012.
U.S. Appl. No. 13/372,938 to Shinya Suzuka, filed Feb. 14, 2012.
U.S. Appl. No. 13/372,955 to Shinya Suzuka, filed Feb. 14, 2012.
U.S. Appl. No. 13/372,987 to Shinya Suzuka, filed Feb. 14, 2012.
U.S. Appl. No. 13/402,065 to Shinya Suzuka, filed Feb. 22, 2012.
U.S. Appl. No. 13/402,072 to Shinya Suzuka, filed Feb. 22, 2012.

\* cited by examiner

*Primary Examiner* — Alicia M Harrington
*Assistant Examiner* — Cara Rakowski
(74) *Attorney, Agent, or Firm* — Greenblum & Bernstein P.L.C.

(57) ABSTRACT

A lens barrel having an insertable/removable optical element includes an advancing/retracting member, an anti-shake frame supported by the advancing/retracting member, an insertable/removable frame holding the insertable/removable optical element and supported by the anti-shake frame, an anti-shake drive mechanism, and a removal drive mechanism which moves the insertable/removable frame between the insertion and the removed positions. The anti-shake drive mechanism includes first and second anti-shake drive actuators positioned on the opposite side of the insertion position from the removed position and are respectively positioned on opposite sides of a straight line connecting a center of the insertable/removable optical element at the insertion position and at the removed position. Directions of driving forces produced by the first and second anti-shake drive actuators are at right angles to each other.

4 Claims, 14 Drawing Sheets

LENS BARREL HAVING AN IMAGE-STABILIZING INSERTABLE/REMOVABLE OPTICAL ELEMENT

BACKGROUND OF THE INVENTION

1. Field of the Invention

The present invention relates to a lens barrel having an image-stabilizing insertable/removable optical element which can be moved to correct image shake and removed to a position outside an anti-shake driving range of the optical element.

2. Description of the Related Art

There has been an increasing number of optical devices such as cameras which are equipped with an anti-shake mechanism (image-stabilizing mechanism/shake reduction mechanism/image stabilizing mechanism) that moves a specific optical element such as a lens element or an image sensor (image pickup device) in a plane orthogonal to an optical axis of an optical system to reduce (correct) image shake. In Japanese Unexamined Patent Publication No. 2007-101993, a technique for removing (radially retracting) an image-stabilizing optical element to a position outside an anti-shake driving range (to a position off an optical axis of the optical system) when an optical device that incorporates the anti-shake mechanism moves from an operating state to a lens barrel accommodated state (fully retracted state/non-operating state) in which no pictures are taken, has been proposed for the purpose of making a lens barrel compact in size.

In the lens barrel disclosed in the aforementioned Japanese Unexamined Patent Publication, an image-stabilizing insertable/removable optical element is held by an insertable/removable frame which is supported to be rotatable about a rotational axis parallel to the optical axis by an anti-shake frame that is driven to correct image shake, and a pair of anti-shake drive actuators (electromagnetic actuators), the directions of driving forces (thrust) of which are made at right angles to each other, are used to drive the anti-shake frame. However, the pair of anti-shake drive actuators shown in the aforementioned Japanese Unexamined Patent Publication may interfere with the image-stabilizing insertable/removable optical element when the insertable/removable frame is driven to rotate (swing) between an insertion position, at which the image-stabilizing insertable/removable optical element is positioned on said optical axis, and a removed position, at which the image-stabilizing insertable/removable optical element is removed from the optical axis. Accordingly, the configuration of the pair of anti-shake drive actuators has been an obstacle in achieving miniaturization of the lens barrel and/or an obstacle to increasing the size of the pair of anti-shake drive actuators (in order to improve the image stabilization capability).

SUMMARY OF THE INVENTION

The present invention has been devised in view of the above-mentioned drawbacks and provides a lens barrel having an image-stabilizing insertable/removable optical element which can be moved to correct image shake and removed to a position outside an anti-shake driving range of the optical element, wherein the image-stabilizing insertable/removable optical element is held by an insertable/removable frame which is supported to be rotatable about a rotational axis parallel to an optical axis by an anti-shake frame that is driven to correct image shake, and wherein there is no possibility of the image-stabilizing insertable/removable optical element interfering with any of the anti-shake drive actuators of an anti-shake drive mechanism, and wherein miniaturization (reduction in diameter) of the lens barrel is possible. In addition, the present invention provides a lens barrel having the aforementioned image-stabilizing insertable/removable optical element, wherein the image stabilization capability of the anti-shake drive actuators can be improved by being increased in size without sacrificing miniaturization of the lens barrel.

According to an aspect of the present invention, a lens barrel is provided having an image-stabilizing insertable/removable optical element provided in a photographing optical system, the lens barrel including an advancing/retracting member which is movable in an optical axis direction of the photographing optical system, wherein the advancing/retracting member is moved between a ready-to-photograph state and a lens barrel accommodated state in which no pictures are taken; an anti-shake frame supported by the advancing/retracting member, the anti-shake frame being movable relative to the advancing/retracting member in a plane orthogonal to the optical axis; an insertable/removable frame which holds the image-stabilizing insertable/removable optical element and is supported by the anti-shake frame to be rotatable about a rotational shaft that is parallel to the optical axis between an insertion position at which the image-stabilizing insertable/removable optical element is positioned on the optical axis and a removed position at which the image-stabilizing insertable/removable optical element is removed from the optical axis; an anti-shake drive mechanism which drives the anti-shake frame to perform an image-stabilizing operation in accordance with vibrations applied to the photographing optical system; and a removal drive mechanism which moves the insertable/removable frame between the insertion position and the removed position when the advancing/retracting member moves between the ready-to-photograph state and the lens barrel accommodated state, respectively. The anti-shake drive mechanism includes a first anti-shake drive actuator and a second anti-shake drive actuator, each of which includes a coil that is supported by one of the advancing/retracting member and the anti-shake frame and a permanent magnet that is supported by the other of the advancing/retracting member and the anti-shake frame, respectively. The first anti-shake drive actuator and the second anti-shake drive actuator are both positioned on the opposite side of the insertion position of the image-stabilizing insertable/removable optical element from the removed position of the image-stabilizing insertable/removable optical element, and are respectively positioned on opposite sides of a straight line which connects a center of the image-stabilizing insertable/removable optical element in the insertion position and a center of the image-stabilizing insertable/removable optical element in the removed position. Directions of driving forces respectively produced by the first anti-shake drive actuator and the second anti-shake drive actuator when the coils thereof are energized are at right angles to each other.

It is desirable for the advancing/retracting member to include a first group of three flat surfaces orthogonal to the optical axis, wherein the anti-shake frame includes a second group of three flat surfaces orthogonal to the optical axis which face the first group of three flat surfaces, respectively. The lens barrel further includes three guide balls installed between the first group of three flat surfaces and the second group of three flat surfaces, respectively, and at least one spring installed between the advancing/retracting member and the anti-shake frame to bias the advancing/retracting member and the anti-shake frame in directions to approach each other to make the first group of three flat surfaces and the second group of three flat surfaces press against the three guide balls, respectively.

It is desirable for one of the three guide balls to be positioned between the first anti-shake drive actuator and the second anti-shake drive actuator and to lie on an extension of the straight line, and for the other two of the three guide balls to be positioned on opposite sides of the straight line, respectively, at bilaterally symmetrical positions, with respect to the image-stabilizing insertable/removable optical element at the insertion position of the insertable/removable frame.

It is desirable for the lens barrel to include two movement limiters arranged on opposite sides of the straight line, respectively, to limit a moving range of the anti-shake frame, each of the movement limiters including a projection which projects from one of the advancing/retracting member and the anti-shake frame in the optical axis direction, and a hole which is formed in the other of the advancing/retracting member and the anti-shake frame so that the projection is loosely fitted in the hole.

According to the present invention, in the lens barrel having an image-stabilizing insertable/removable optical element which can be moved to correct image shake and removed to a position outside an anti-shake driving range of the optical element and which is supported by an insertable/removable frame that is supported by an anti-shake frame to be rotatable about a rotational shaft parallel to an optical axis, there is no possibility of the image-stabilizing insertable/removable optical element interfering with either of the first and second anti-shake drive actuators of the anti-shake drive mechanism; hence, the lens barrel can be miniaturized (reduced in diameter). In addition, since neither of the first and second anti-shake drive actuators interfere with the image-stabilizing insertable/removable optical element, the image stabilization capability of the first and second anti-shake drive actuators can be improved by being increased in size without sacrificing miniaturization of the lens barrel.

The present disclosure relates to subject matter contained in Japanese Patent Applications Nos. 2011-42027 (filed on Feb. 28, 2011) and 2011-65804 (filed on Mar. 24, 2011) which are expressly incorporated herein by reference in their entireties.

BRIEF DESCRIPTION OF THE DRAWINGS

The present invention will be described below in detail with reference to the accompanying drawings in which.

DESCRIPTION OF THE EMBODIMENT

Figure 1:
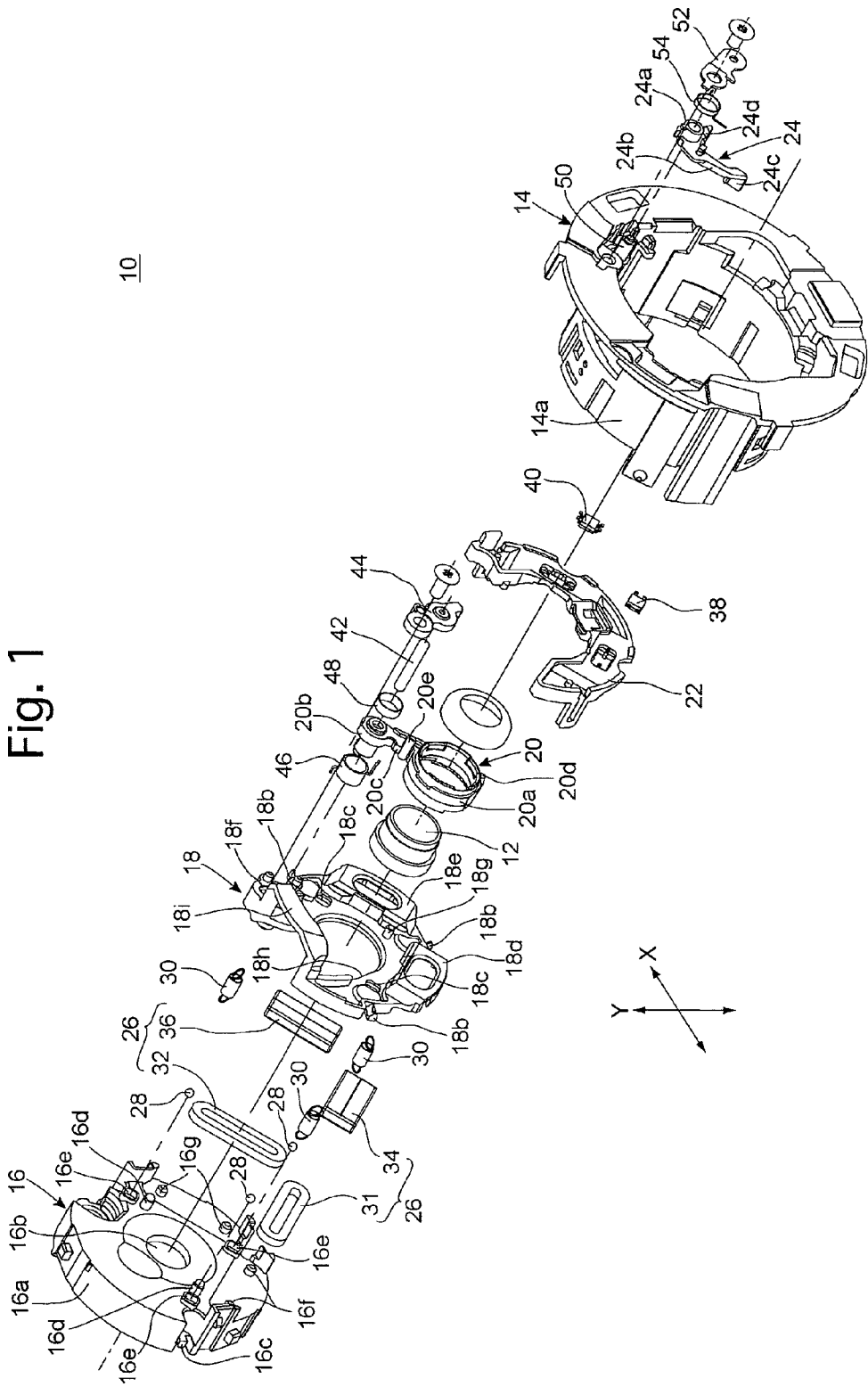
FIG. 1 is a rear exploded perspective view of an embodiment of an anti-shake lens unit according to the present invention that is designed for a lens shutter camera having a retractable photographic lens.
Figure 2:
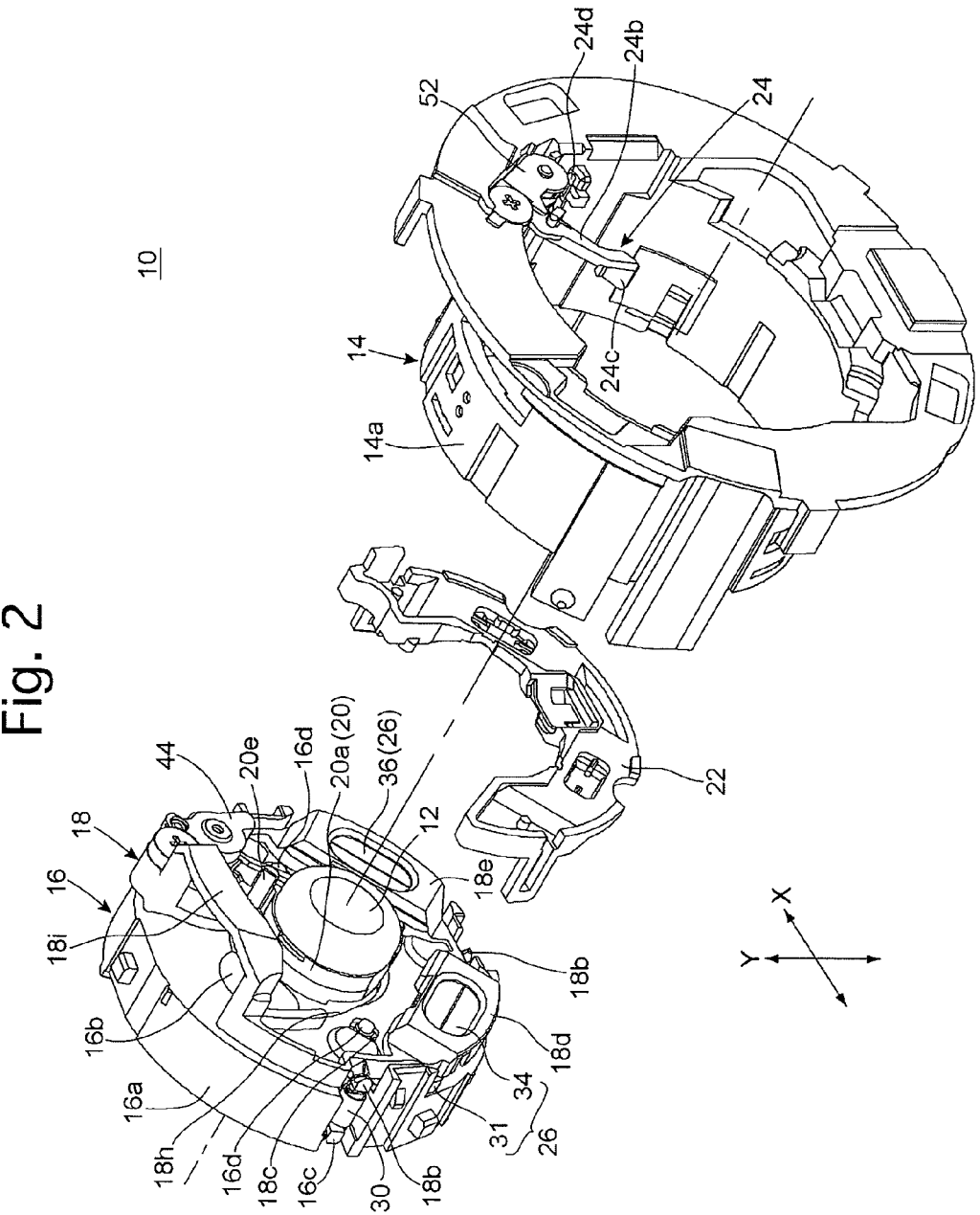
FIG. 2 is an exploded rear perspective view of the anti-shake lens unit with a sensor holder and a linear moving ring dismounted.
Figure 3:
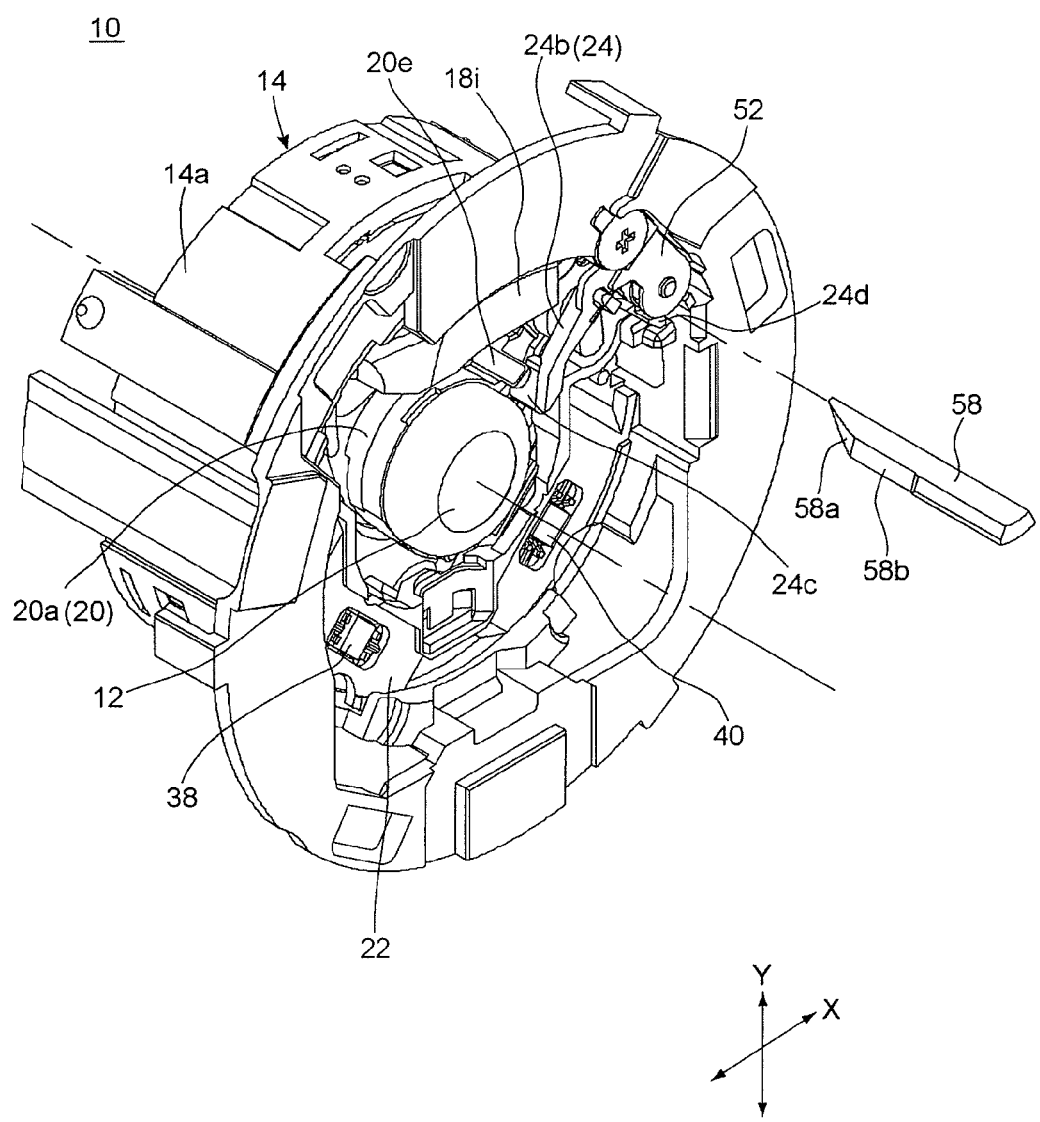
FIG. 3 is a rear perspective view of the anti-shake lens unit and a insertion/removal control-projection in the middle of the lens barrel retracting operation of the lens barrel.
Figure 4:
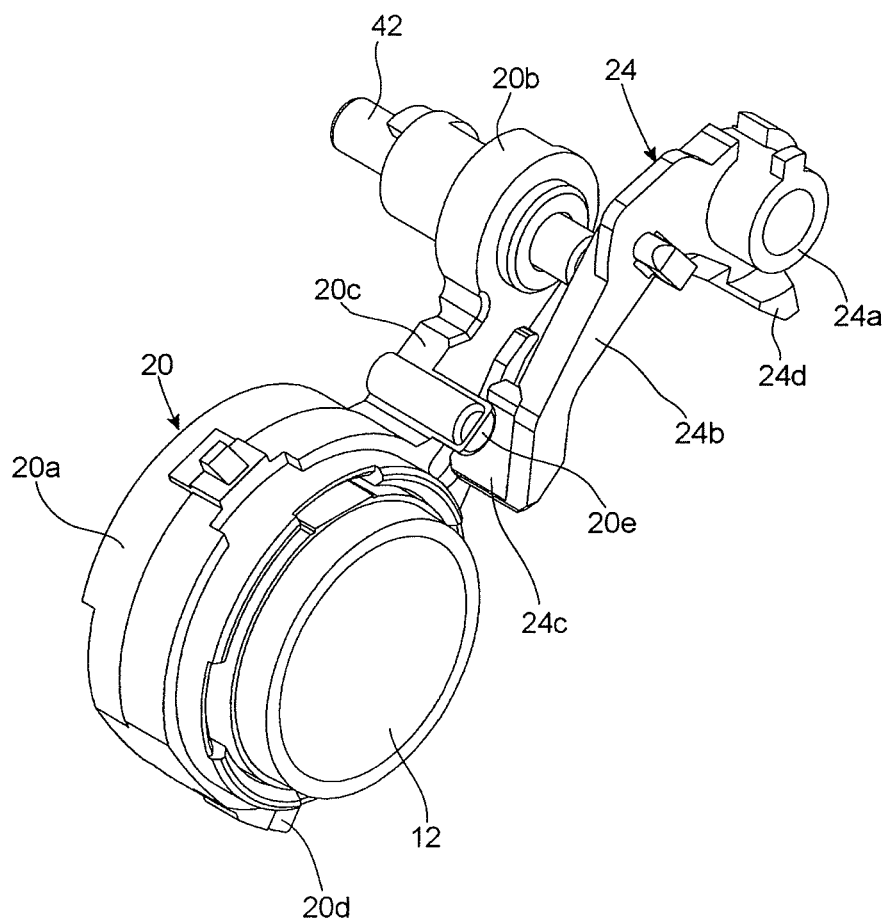
FIG. 4 is a rear perspective view of an insertable/removable frame and a removal drive lever, showing the positional relationship therebetween in a ready-to-photograph state of the lens barrel.
Figure 5:
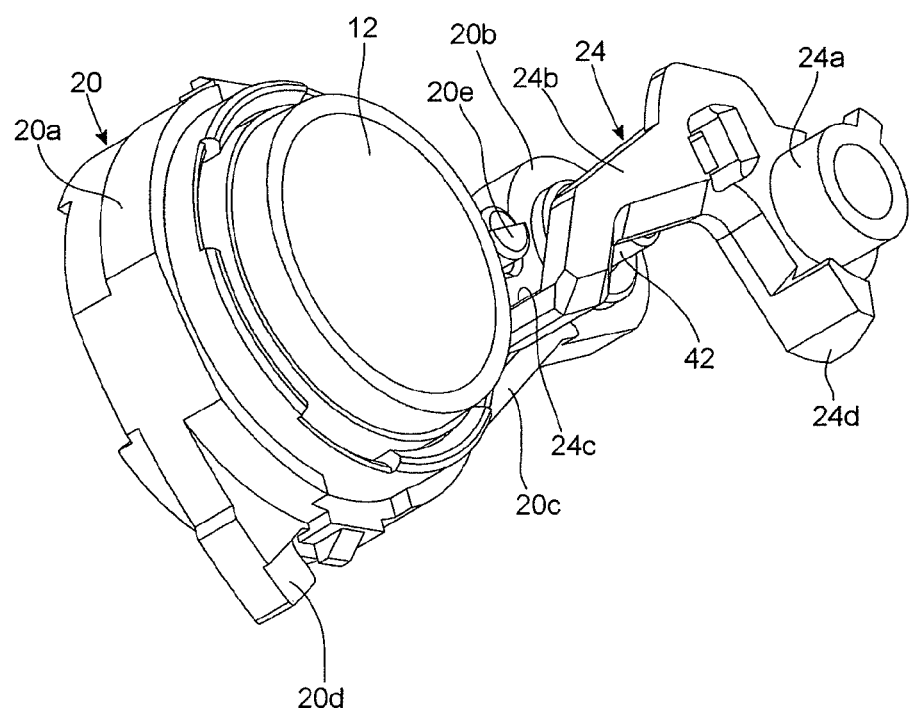
FIG. 5 is a rear perspective view of the insertable/removable frame and the removal drive lever in the ready-to-photograph state of the lens barrel, viewed from a different angle.

An anti-shake lens unit 10 shown in FIGS. 1 through 3 supports an insertable/removable image-stabilizing lens (insertable/removable image-stabilizing optical element) 12 which constitutes a part of a photographing optical system of a lens barrel of a camera. As shown in FIG. 1, the anti-shake lens unit 10 is provided with a linear moving ring (advancing/retracting member) 14, and is provided in the linear moving ring 14 with a shutter unit (advancing/retracting member) 16, an anti-shake frame 18, an insertable/removable frame 20, a sensor holder 22, a removal drive lever (removal drive mechanism/rotational relay member) 24 and a pair of anti-shake drive actuators (anti-shake drive mechanism) 26.

Although the overall structure of the lens barrel in which the anti-shake lens unit 10 is incorporated is not shown in the drawings, the linear moving ring 14 is supported inside the lens barrel thereby in a manner to be linearly movable in a direction along a photographing optical axis O of the photographing optical system, and the linear moving ring 14 is moved toward an image plane from the object side when the lens barrel is brought into a lens barrel accommodated state (fully retracted state) from a ready-to-photograph state. In the following descriptions, the optical axis direction refers to a direction along or parallel to the photographing optical axis O, and the front and the rear refer to the front (object side) and the rear (image plane side) with respect to the optical axis direction. A known cam mechanism or the like can be adapted as a mechanism for moving the linear moving ring 14 in the optical axis direction.

The linear moving ring 14 is provided with a cylindrical portion 14a which surrounds the photographing optical axis O, and the shutter unit 16 is fixed to the inside of the cylindrical portion 14a. The shutter unit 16 is provided with a shutter housing 16a including a shutter (not shown) and has a photographing aperture 16b (see FIG. 1) which extends through a center of the shutter housing 16a in the optical axis direction. A shutter actuator provided in the shutter unit 16 drives the above-mentioned shutter to open and shut the photographing aperture 16b. The shutter housing 16a is provided, at three different circumferential positions on the outer periphery of the shutter housing 16a, with three spring hook projections 16c (only one of which is shown in FIGS. 1 and 2), respectively, and is provided on a rear surface thereof with two movement limit projections (movement limiter) 16d and three ball support holes 16e. The ball support holes 16e are bottomed holes which are open toward the rear (see FIG. 13).

Figure 13:
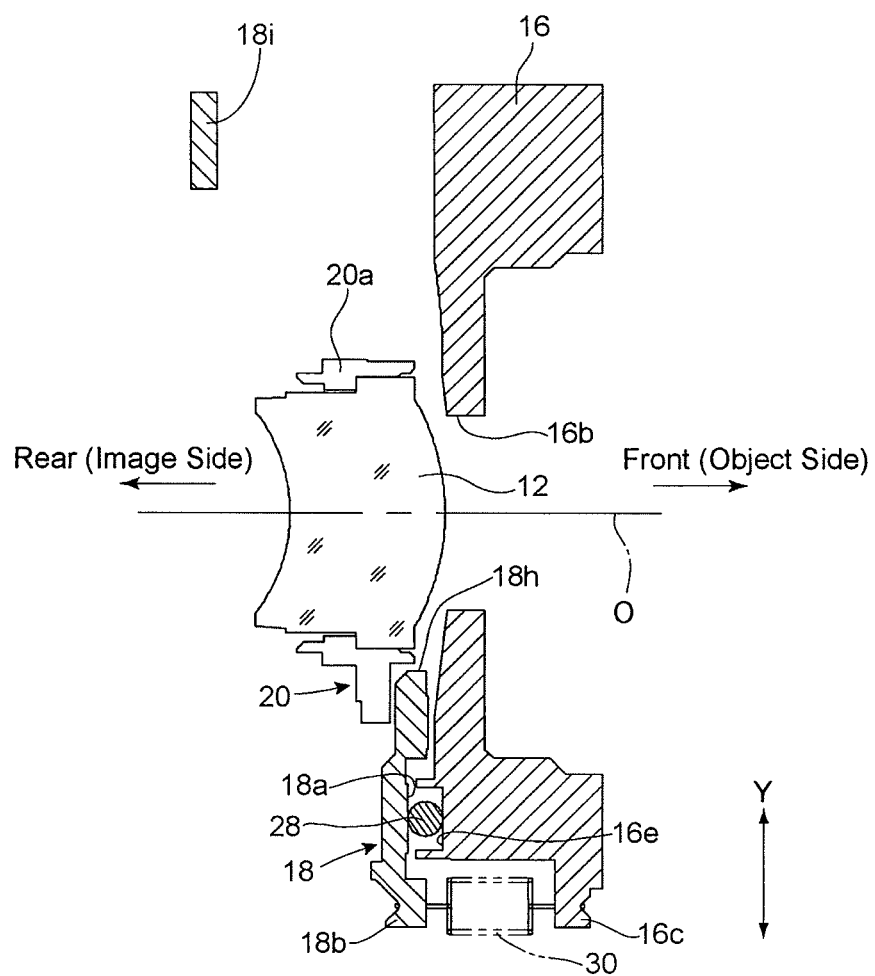
FIG. 13 is a sectional view taken along the line A-A shown in FIG. 12.

The anti-shake frame 18 is supported at the rear of the shutter unit 16. As shown in FIG. 13, three ball contact surfaces 18a are formed on the front of the anti-shake frame 18 that faces the shutter unit 16, and three guide balls (anti-shake guide members) 28 are held between the three ball contact surfaces 18a and the bottoms of the three ball support holes 16e, respectively. As mentioned above, the shutter unit 16 is provided with the three ball support holes 16e, and the three ball contact surfaces 18a and the three guide balls 28 are provided to correspond to the three ball support holes 16e. The three ball contact surfaces 18a are flat surfaces which lie in a plane substantially orthogonal to the photographing optical axis O. The three guide balls 28 are loosely fitted in the three ball support holes 16e, respectively, so that there is a clearance between each guide ball 28 and the inner wall of the associated ball support hole 16e in directions substantially orthogonal to the photographing optical axis O. When positioned in the vicinity of the center of the associated support hole 16e, each guide ball 28 does not come in contact with the inner wall of the associated ball support hole 16e.

The anti-shake frame 18 is provided, at three different circumferential positions on the outer periphery thereof, with three spring hook projections 18b, respectively, and three extension springs (anti-shake frame biasing member/first biaser) 30 are extended and installed between the three spring hook projections 18b and the three spring hook projections 16c, respectively. The anti-shake frame 18 is biased in a direction to approach the shutter unit 16 (i.e., is biased forward) by the biasing force of the three extension springs 30 to make the three ball contact surfaces 18a press against the three guide balls 28, respectively, to thereby prevent the anti-shake frame 18 from moving forward. In this state, the three ball contact surfaces 18a are in point contact with the three guide balls 28, respectively, and the anti-shake frame 18 can freely move in directions orthogonal to the photographing optical axis O by making the three ball contact surfaces 18a slidingly contact the three guide balls 28 (or while making the three guide balls 28 roll when the three guide balls 28 are not in contact with the inner walls of the three ball support holes 16e, respectively).

The anti-shake frame 18 is further provided with two movement limit holes (movement limiter) 18c into which the two movement limit projections 16d of the shutter unit 16 are inserted, respectively. As shown in FIGS. 6 through 12, the inner wall of each movement limit hole 18c is rectangular, generally square in shape in a plane substantially orthogonal to the photographing optical axis O. In the following descriptions, the direction of one of the two diagonal lines across the inner wall of each movement limit hole 18c in a plane orthogonal to the photographing optical axis O refers to the X-axis direction and the direction of the other diagonal line refers to the Y-axis direction. The anti-shake frame 18 can freely move relative to the shutter unit 16 (the linear moving ring 14) in a plane orthogonal to the photographing optical axis O within a range until the movement limit projections 16d come into contact with the inner walls of the two movement limit holes 18c, respectively.

The anti-shake frame 18 is driven by the pair of anti-shake drive actuators 26. Each of the pair of anti-shake drive actuators 26 is provided with two coils 31 and 32 which are supported by the shutter unit 16, and is further provided with two permanent magnets 34 and 36 which are supported by the anti-shake frame 18. The two permanent magnets 34 and 36 are fixed to two magnet holding portions 18d and 18e, respectively, which are provided on the anti-shake frame 18. The permanent magnets 34 and 36 are substantially identical in shape and size to each other. Each of the permanent magnets 34 and 36 is in the shape of a narrow, thin rectangular plate. The permanent magnets 34 and 36 are arranged symmetrically with respect to an imaginary plane P (see FIGS. 6 through 12) which lies on the photographing optical axis O and extends in the Y-axis direction. More specifically, opposite sides of a magnetic pole boundary line M1 (see FIGS. 8 and 11) of the permanent magnet 34 which extends in the lengthwise direction thereof and passes through an approximate center of the permanent magnet 34 with respect to the width thereof are magnetized into north and south poles, respectively, while opposite sides of a magnetic pole boundary line M2 (see FIGS. 8 and 11) of the permanent magnet 36 which extends in the lengthwise direction thereof and passes through an approximate center of the permanent magnet 36 with respect to the width thereof are magnetized into north and south poles, respectively.

In other words, each of the magnetic pole boundary lines M1 and M2 define a boundary between north and south poles of each of the permanent magnets 34 and 36, respectively. The magnetic pole boundary line M1 of the permanent magnet 34 and the magnetic pole boundary line M2 of the permanent magnet 36 are inclined to each other so that the distance therebetween (i.e., the distance from the imaginary plane P) increases in an increasingly upward direction (toward a removed position of the insertable/removable frame 20 which will be discussed later) from the bottom end in the Y-axis direction (from an insertion position side of the insertable/removable frame 20 which will be discussed later). The inclination angle of each magnetic pole boundary line M1 and M2 with respect to the imaginary plane P is set to approximately 45 degrees. Namely, the lengthwise directions (the magnetic pole boundary lines M1 and M2) of the permanent magnets 34 and 36 are substantially orthogonal to each other.

Figure 8:
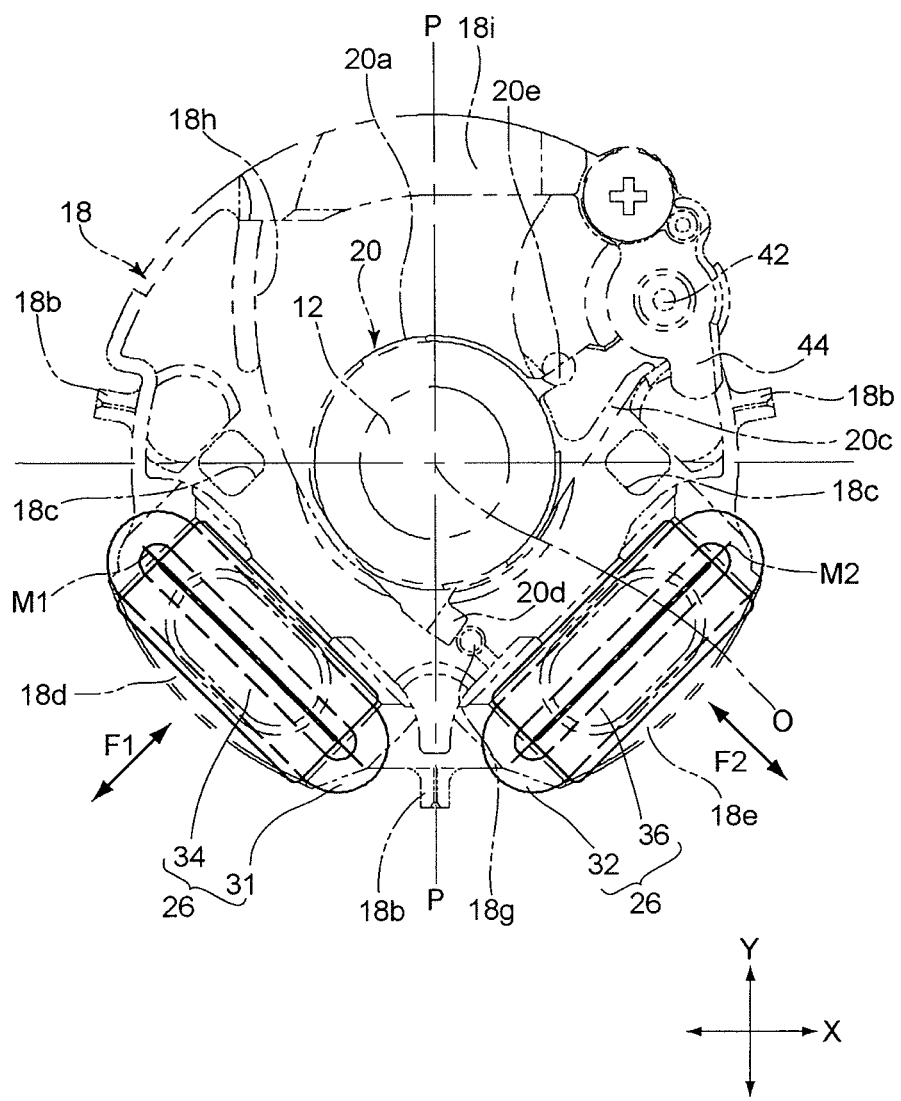
FIG. 8 is a diagram of the elements of an anti-shake drive actuator shown in FIG. 7 shown in a manner to emphasize these elements.
Figure 11:
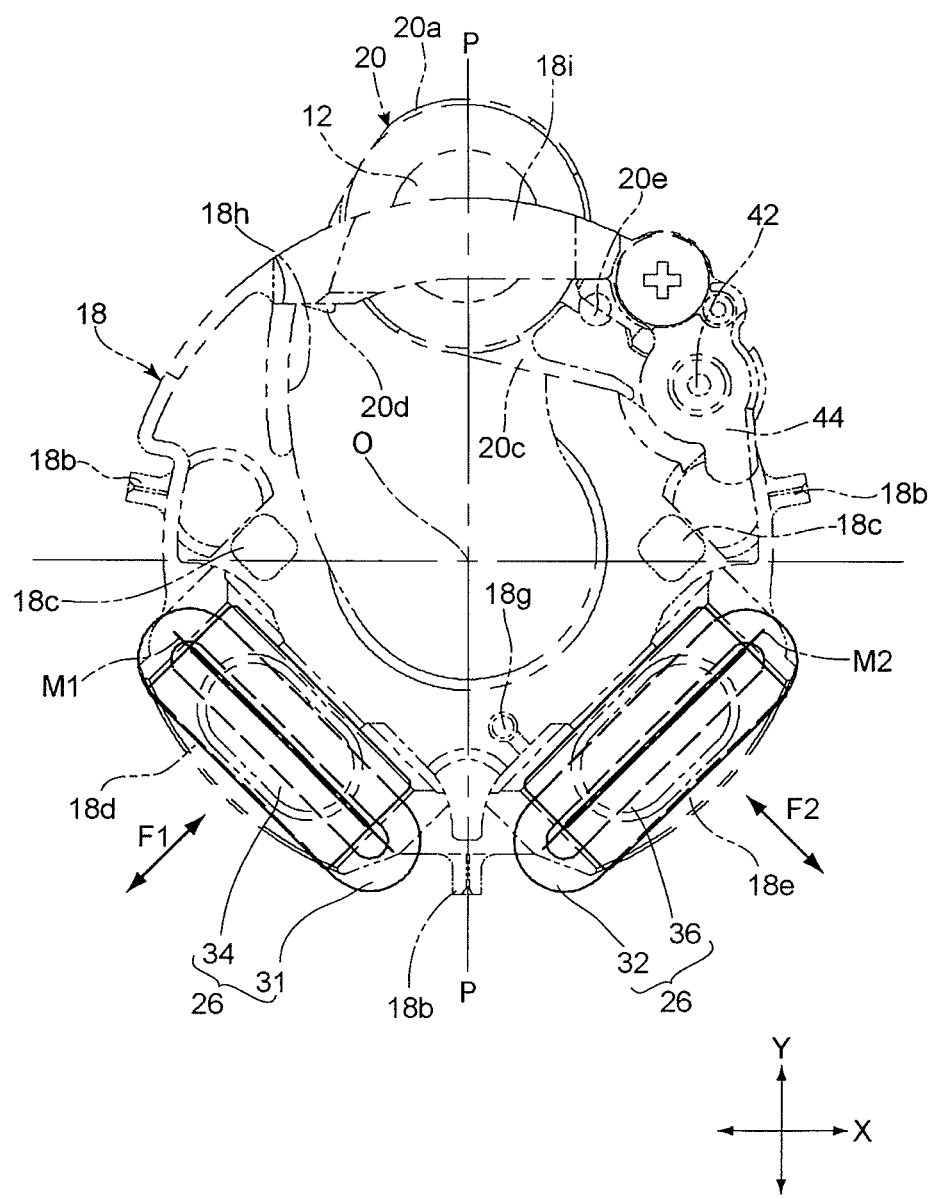
FIG. 11 is a diagram of the elements of the anti-shake drive actuator shown in FIG. 10 shown in a manner to emphasize these elements.
Figure 12:
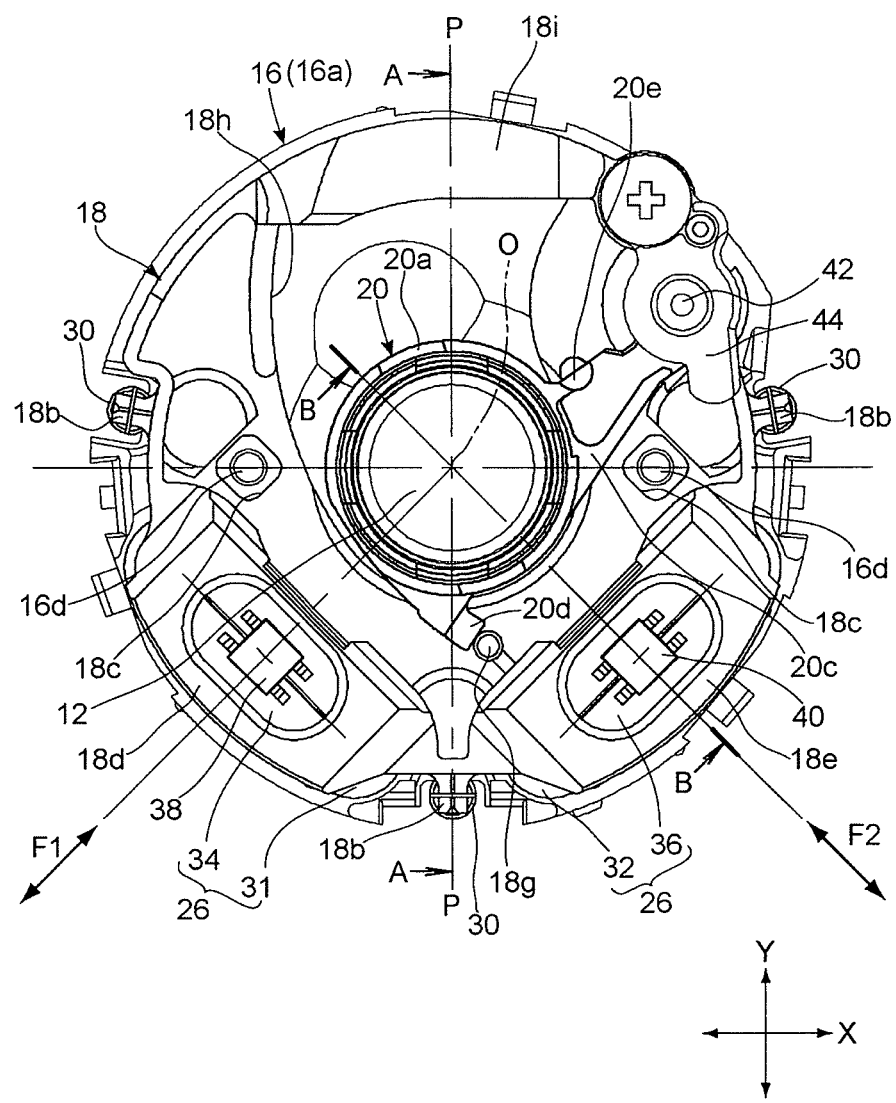
FIG. 12 is a rear elevational view of the anti-shake lens unit in the ready-to-photograph state with the linear moving ring and the sensor holder removed, viewed from the image plane side.

As shown in FIGS. 1, 8 and 11, each of the coils 31 and 32 is an air-core coil which includes a pair of elongated portions that are substantially parallel to each other and a pair of curved (U-shaped) portions which connect the pair of elongated portions at respective ends thereof. The coils 31 and 32 are substantially identical in shape and size to each other. The shutter housing 16a is provided on the rear thereof with a pair of positioning projections 16f and a pair of positioning projections 16g (see FIG. 1). The coil 31 is supported on the shutter unit 16 with the pair of positioning projections 16f engaged into the air-core portion of the coil 31, and the coil 32 is supported on the shutter unit 16 with the pair of positioning projections 16g engaged into the air-core portion of the coil 32. In this supporting state, the lengthwise direction of the coil 31 is substantially parallel to the magnetic pole boundary line M1 and the lengthwise direction of the coil 32 is substantially parallel to the magnetic pole boundary line M2. The coils 31 and 32 are connected to a flexible PWB (printed wiring board (not shown)) which extends from the shutter unit 16, and are further connected to a control circuit board of the camera, in which the present embodiment of the anti-shake lens unit 10 is incorporated, via another flexible PWB (not shown) provided inside the lens barrel. The control of power that is applied to the coils 31 and 32 is performed by a control circuit on the above-mentioned control circuit board.

Figure 14:
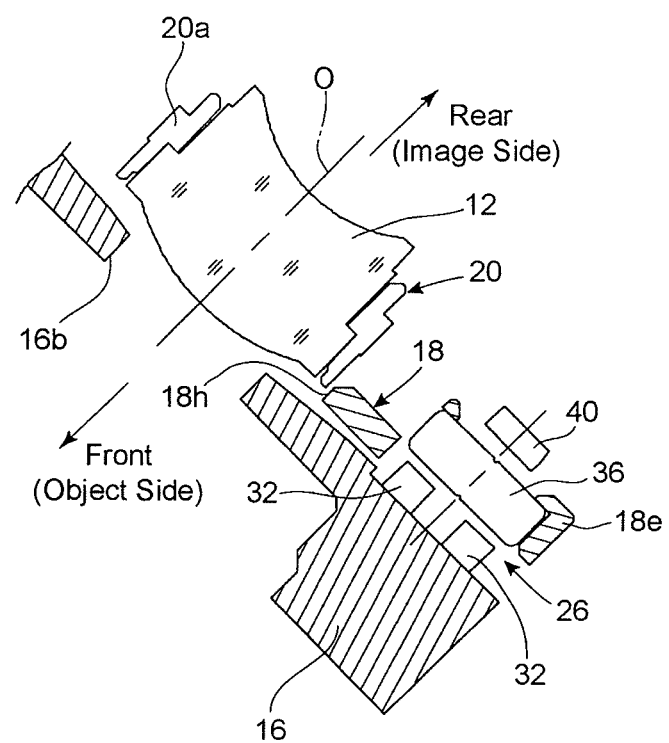
FIG. 14 is a sectional view taken along the line B-B shown in FIG. 12.

In each of the pair of anti-shake drive actuators 26 that has the above described structure, the coil 31 and the permanent magnet 34 face each other in the optical axis direction, and a driving force is generated in a direction substantially orthogonal to the magnetic pole boundary line M1 of the permanent magnet 34 (i.e., orthogonal to the lengthwise direction of the coil 31) in a plane orthogonal to the optical axis O upon the coil 31 being energized. The direction of action of this driving force is shown by a double-headed arrow F1 in FIGS. 8, 11 and 12. In addition, the coil 32 and the permanent magnet 36 face each other in the optical axis direction as shown in FIG. 14, and a driving force is generated in a direction substantially orthogonal to the magnetic pole boundary line M2 of the permanent magnet 36 (i.e., orthogonal to the lengthwise direction of the coil 32) in a plane orthogonal to the optical axis O upon the coil 32 being energized. The direction of action of this driving force is shown by a double-headed arrow F2 in FIGS. 8, 11 and 12. The direction of action of each of the two aforementioned driving forces intersects both the X-axis direction and the Y-axis direction at an angle of approximately 45 degrees, so that the anti-shake frame 18 can be moved to any arbitrary position in a plane orthogonal to the photographing optical axis O by controlling the passage of current through each of the coils 31 and 32. As described above, the moving range of the anti-shake frame 18 is limited by engagement of the inner walls of the two movement limit holes 18c with the two movement limit projections 16d, respectively.

The sensor holder 22 is fixed to the rear of the anti-shake frame 18. The sensor holder 22 has a shape covering the rear sides of the two magnet holding portions 18d and 18e and supports two position detection sensors 38 and 40 that are respectively positioned behind the two permanent magnets 34 and 36. The position detection sensors 38 and 40 are connected to the aforementioned flexible PWB (not shown), which extends from the shutter unit 16, and are further connected to the aforementioned control circuit board of the camera, in which the present embodiment of the anti-shake lens unit 10 is incorporated, via the aforementioned other flexible PWB (not shown) provided inside the lens barrel. The drive position of the anti-shake frame 18 that is driven by the pair of anti-shake drive actuators 26 can be detected via the position detection sensors 38 and 40.

The anti-shake lens unit 10 is provided with an insertable/removable frame 20 which is supported by the anti-shake frame 18 thereon to be rotatable (swingable) about a rotational shaft 42 that extends parallel to the photographing optical axis O. The front end of the rotational shaft 42 is fixedly fitted into a shaft support hole 18f formed in the anti-shake frame 18, and the rear end of the rotational shaft 42 is fixed to a retaining member 44 fixed to the anti-shake frame 18. The insertable/removable frame 20 is provided with a cylindrical lens holder portion 20a, a shaft bearing portion 20b and an arm portion 20c. The cylindrical lens holder portion 20a holds the insertable/removable image-stabilizing lens 12, the rotational shaft 42 is inserted into the shaft bearing portion 20b, and the cylindrical lens holder portion 20a and the shaft bearing portion 20b are connected via the arm portion 20c. The insertable/removable frame 20 is swingable (rotatable) about the rotational shaft 42 between the insertion position shown in FIGS. 2 through 8 and 12 and the removed position shown in FIGS. 9 through 11, and the insertion position is defined by engagement of a stopper contact portion 20d formed on the cylindrical lens holder portion 20a with a stopper 18g formed on the anti-shake frame 18. The insertable/removable frame 20 is biased toward the insertion position by an insertable/removable frame biasing spring (insertable/removable-frame biasing member/second biaser) 46. The insertable/removable frame biasing spring 46 is configured of a torsion coil spring, the ends of which are hooked onto the anti-shake frame 18 and the insertable/removable frame 20, respectively. In addition, an optical-axis-direction biasing spring 48 configured of a compression spring is installed between the shaft bearing portion 20b and the retaining member 44, and the insertable/removable frame 20 is biased forward by the optical-axis-direction biasing spring 48 so that the position of the insertable/removable frame 20 in the optical axis direction is stabilized.

When the insertable/removable frame 20 is in the insertion position, the insertable/removable image-stabilizing lens 12 is positioned on the photographing optical axis O. When the insertable/removable frame 20 rotates to the removed position in a state where the anti-shake frame 18 is at the movement limit thereof in the Y-axis direction (hereinafter referred to as the removal assisting position), in which the end of the inner wall of the movement limit holes 18c of the anti-shake frame 18 on the insertion position side (the lower end of the inner wall of each movement limit hole 18c with respect to FIGS. 6 through 12) comes into contact with the associated movement limit projection 16d, the center of the insertable/removable image-stabilizing lens 12 is displaced from the photographing optical axis O in the Y-axis direction. A clearance hole 18h, the shape of which corresponds to the path of movement of the cylindrical lens holder portion 20a that is defined by the arc-shaped path about the rotational shaft 42, is formed through the anti-shake frame 18, and the front end of the cylindrical lens holder portion 20a is positioned in the clearance hole 18h when the insertable/removable frame 20 is at the removed position. The clearance hole 18h is open at (extends through) a portion of the outer periphery of the anti-shake frame 18, and the anti-shake frame 18 is provided over this opening portion with a reinforcing bridge 18i. As can be seen in FIGS. 1 and 2, the reinforcing bridge 18i is offset rearwardly to be prevented from interfering with the cylindrical lens holder portion 20a when the insertable/removable frame 20 rotates to the removed position.

The removal drive lever 24 is positioned in the linear moving ring 14 and supported thereby to be rotatable (swingable) about a rotational shaft 50 that is parallel to the photographing optical axis O. The rotational shaft 50 is formed integral with the linear moving ring 14 so as to be positioned in the vicinity of the rotational shaft 42. The rotational shaft 50 is inserted into a shaft hole formed through a shaft bearing portion 24a of the removal drive lever 24. A retaining plate 52 is fixed to the rear of the linear moving ring 14 to prevent the removal drive lever 24 from moving rearward. The removal drive lever 24 is provided with an arm portion 24b which extends radially from the shaft bearing portion 24a and is further provided in the vicinity of the free end of the arm portion 24b with a removal pressing portion 24c that is capable of coming into contact with a pressing-force receiving part 20e formed on the arm portion 20c of the insertable/removable frame 20.

Figure 6:
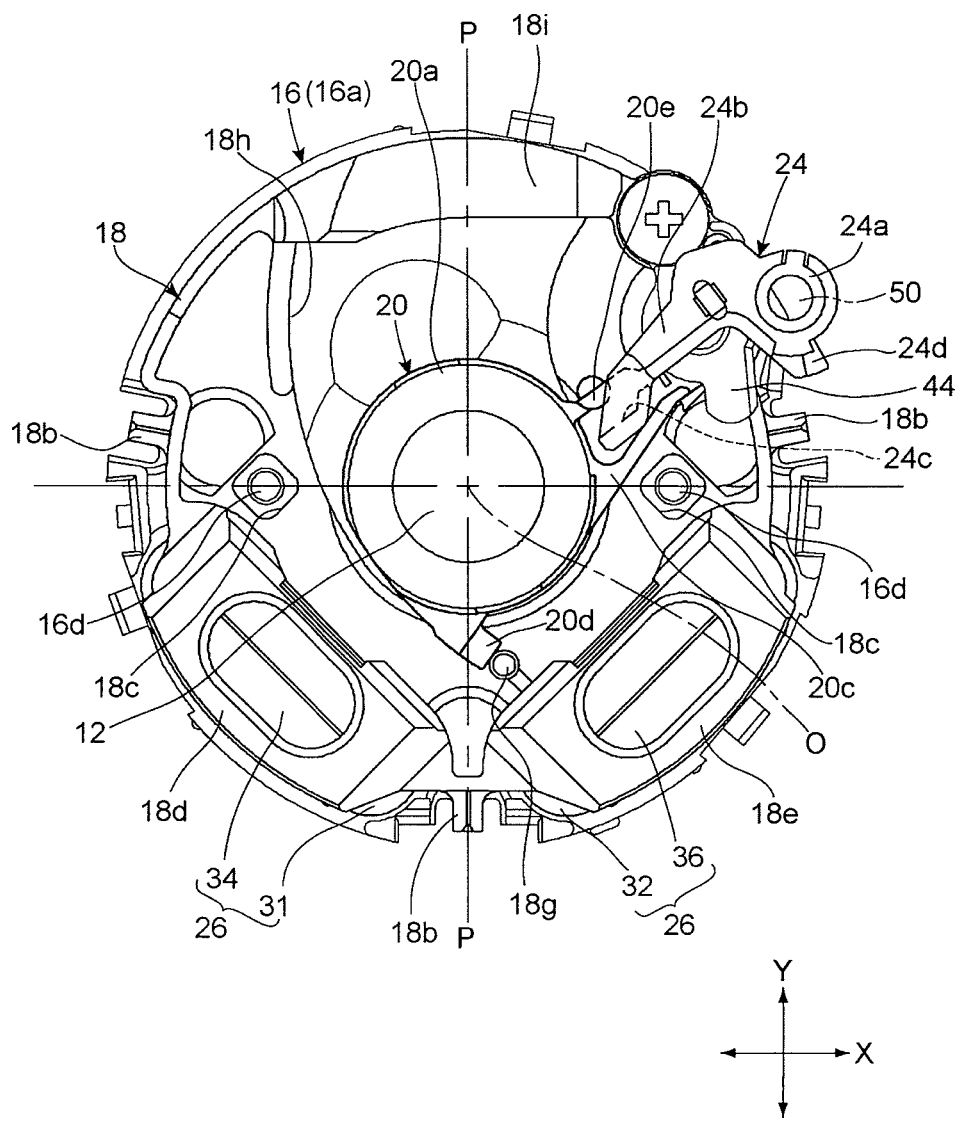
FIG. 6 is a rear elevational view of part of the anti-shake lens unit in the ready-to-photograph state of the lens barrel, viewed from the image plane side.
Figure 7:
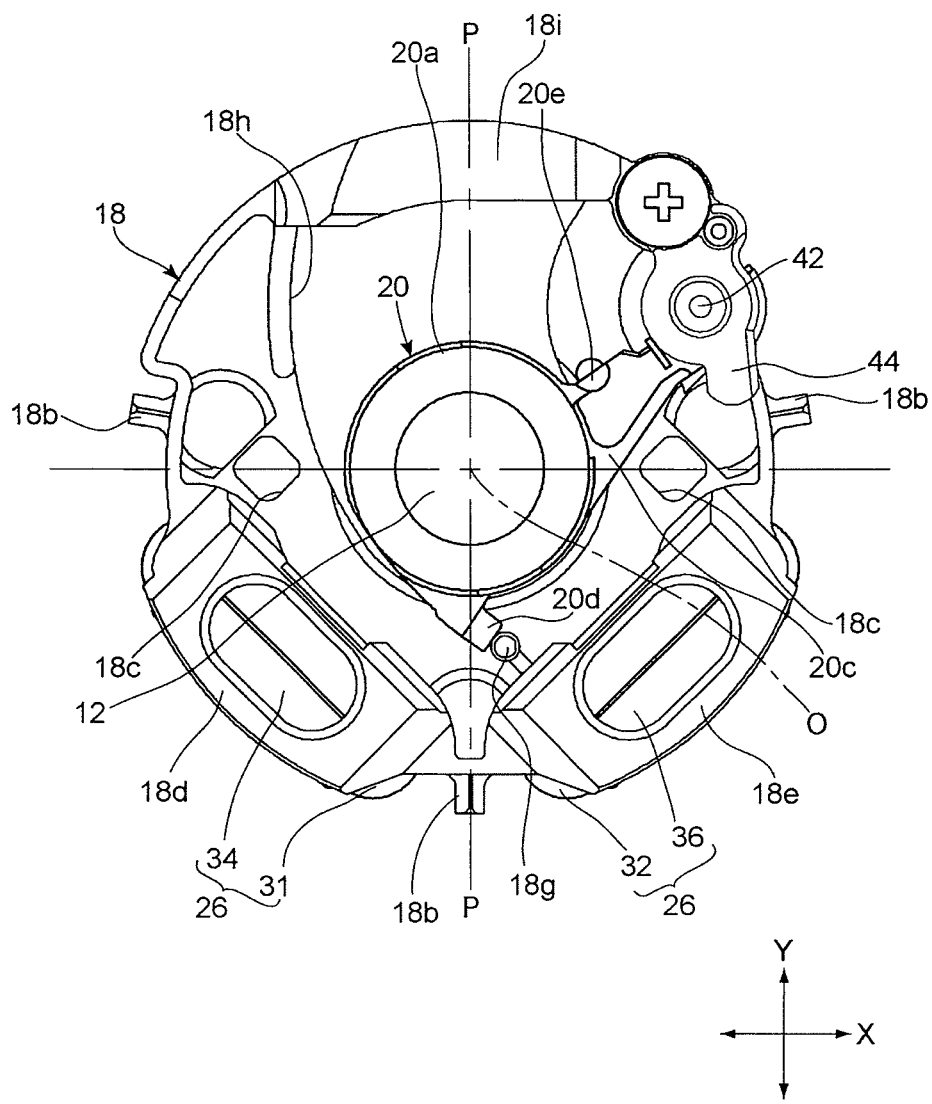
FIG. 7 is a rear elevational view that shows elements of the anti-shake lens unit shown in FIG. 6 which are driven during an image-stabilizing operation and coils shown in FIG. 6.

The biasing force of the insertable/removable frame biasing spring 46 urges the insertable/removable frame 20 to rotate toward the insertion position from the removed position (counterclockwise direction with respect to FIGS. 6 through 12), and the removal drive lever 24 is also biased to rotate in the same direction (counterclockwise direction with respect to FIGS. 6 through 12) by a removal drive lever biasing spring 54. A stopper (not shown) which determines the rotation limit of the removal drive lever 24 in the biasing direction of the removal drive lever biasing spring 54 is formed on the inside of the linear moving ring 14. On the other hand, rotation of the insertable/removable frame 20 in the biasing direction of the insertable/removable frame biasing spring 46 is limited by engagement between the stopper contact portion 20d and the stopper 18g. FIG. 6 shows a state where the insertable/removable frame 20 and the removal drive lever 24 are in contact with the stopper 18g and the aforementioned stopper (not shown) of the linear moving ring 14, respectively, and at this stage the pressing-force receiving part 20e and the removal pressing portion 24c are spaced from each other (see FIGS. 4 and 5). The clearance between the pressing-force receiving part 20e and the removal pressing portion 24c is determined to be such a degree as to prevent the pressing-force receiving part 20e from coming in contact with the removal pressing portion 24c in the moving range of the anti-shake frame 18 relative to the shutter unit 16 (i.e., the aforementioned range until the movement limit projections 16d come into contact with the inner walls of the two movement limit holes 18c, respectively). In other words, the anti-shake lens unit 10 is configured so that the removal drive lever 24 does not interfere with either of the anti-shake driving operations of the anti-shake frame 18 and the insertable/removable frame 20 that are performed by the pair of anti-shake drive actuators 26. If no external force is exerted on the insertable/removable frame 20 and the removal drive lever 24, the state shown in FIGS. 6 through 8, in which the insertable/removable frame 20 is held in the insertion position by the biasing force of the insertable/removable frame biasing spring 46, is maintained.

The removal drive lever 24 is provided in the vicinity of the shaft bearing portion 24a with a pressing-force receiving part 24d. A insertion/removal control-projection (removal drive mechanism/pressing member) 58 (see FIG. 3) is a stationary member which is fixed to the inside of the lens barrel to be positioned behind the removal drive lever 24. Rearward movement of the linear moving ring 14 when the lens barrel moves from a ready-to-photograph state to the lens barrel accommodated state causes the insertion/removal control-projection 58 to come into contact with and press the pressing-force receiving part 24d to rotate the removal drive lever 24 in a direction toward the removed position of the insertable/removable frame 20 from the insertion position of the insertable/removable frame 20. More specifically, the insertion/removal control-projection 58 is provided at the front end thereof with an end-face cam 58a, and retracting movement of the linear moving ring 14 toward the insertion/removal control-projection 58 causes the pressing-force receiving part 24d to come into contact with the end-face cam 58a. Subsequently, a further retracting movement of the linear moving ring 14 with the pressing-force receiving part 24d remaining in contact with the end-face cam 58a causes a component force which makes the removal drive lever 24 rotate in a direction against the biasing force of the removal drive lever biasing spring 54 (in a direction toward the removed position of the insertable/removable frame 20) created from the rearward moving force of the linear moving ring 14 in the optical axis direction, so that the removal drive lever 24 solely rotates by an amount of rotation corresponding to the aforementioned clearance, which causes the removal pressing portion 24c to come into contact with the pressing-force receiving part 20e of the insertable/removable frame 20. Thereupon, the pressing force in the direction toward the removed position of the insertable/removable frame 20 is transmitted to the insertable/removable frame 20 via the removal pressing portion 24c and the pressing-force receiving part 20e, which causes the removal drive lever 24 to press and rotate the insertable/removable frame 20 toward the removed position against the biasing forces of both the insertable/removable frame biasing spring 46 and the removal drive lever biasing spring 54. After the insertable/removable frame 20 reaches the removed position, a removed-lens holding surface 58b which is formed on a side of the insertion/removal control-projection 58 to extend substantially parallel to the optical axis O is engaged with a side of the pressing-force receiving part 24d, so that the insertable/removable frame 20 is held in the removed position (see FIG. 9).

The positional relationship between the anti-shake frame 18, the insertable/removable image-stabilizing lens 12 (the insertable/removable frame 20) and the pair of anti-shake drive actuators 26 will be discussed hereinafter with reference mainly to FIG. 9. The pair of anti-shake drive actuators 26 are respectively positioned on opposite sides of a Y-direction straight line which connects the center (optical axis) of the insertable/removable image-stabilizing lens 12 at the insertion position of the insertable/removable frame 20 and the center (optical axis) of the insertable/removable image-stabilizing lens 12 at the removed position of the insertable/removable frame 20 (i.e., on opposite sides of a Y-axis); in addition, the pair of anti-shake drive actuators 26 are positioned axisymmetrically with respect to the Y-direction straight line (with respect to an imaginary plane P shown in FIGS. 6 through 12 which lies on the photographing optical axis O and extends in the Y-axis direction); furthermore, the pair of anti-shake drive actuators 26 are positioned on the opposite side of the insertion position of the insertable/removable frame 20 from the removed position thereof. The directions of driving forces F1 and F2 of the pair of anti-shake drive actuators 26 are at right angles to each other as described above (magnetic-pole boundary lines M1 and M2 of the pair of anti-shake drive actuators 26 are each angled relative to the Y-axis at an angle of ±45 degrees). As the pair of anti-shake drive actuators 26 are arranged in the abovementioned manner, there is no possibility of the pair of anti-shake drive actuators 26 and the insertable/removable image-stabilizing lens 12 (and the insertable/removable frame 20) interfering with each other even when the insertable/removable frame 20 rotates (swings) between the insertion position and the removed position. This makes it possible to reduce the diameter of the lens barrel (the anti-shake frame 18) (i.e., causes no increase in size (diameter) of the lens barrel (the anti-shake frame 18)). Additionally, a sufficient driving force to reduce image shake can be obtained because the pair of anti-shake drive actuators 26 can be increased in size.

In addition, the positional relationship among three groups of rolling-motion structures installed between the shutter unit 16 and the anti-shake frame 18 configured of the three ball support holes 16e, the three ball contact surfaces 18a, the three guide balls 28 and the three extension springs 30, respectively, will be hereinafter discussed with reference mainly to FIG. 9. Both the bottom surface of each ball support hole 16e and each ball contact surface 18a are flat surfaces which face each other and each of which is orthogonal to the photographing optical axis O (see FIG. 13), and the three extension springs 30 which are respectively extended and installed between the three spring hook projections 18b and the three spring hook projections 16c make the base surfaces of the three ball support holes 16e and the three ball contact surfaces 18a press against the three guide balls 28 from the opposite sides in the optical axis direction, respectively. Among the three groups of rolling-motion structures (which include the three guide balls 28, respectively), one of the three groups of rolling-motion structures is positioned between the pair of (first and second) anti-shake drive actuators 26, lies on the Y-direction straight line (the Y-axis) that connects the center of the insertable/removable image-stabilizing lens 12 at the insertion position of the insertable/removable frame 20 and the center of the insertable/removable image-stabilizing lens 12 at the removed position of the insertable/removable frame 20; while the other two groups of rolling-motion structures are provided at bilaterally symmetrical positions with respect to the Y-direction straight line and are positioned slightly above an X-direction straight line (i.e., an X-axis), which is orthogonal to the Y-direction straight line (i.e., the Y-axis) and passes through the center (i.e., the photographing optical axis O) of the insertable/removable image-stabilizing lens 12 in the insertion position of the insertable/removable frame 20. Such an arrangement of the three groups of rolling-motion structures in association with the first and second anti-shake drive actuators 26 makes it possible to drive the anti-shake frame 18 in directions orthogonal to the photographing optical axis O smoothly by the driving forces produced by the first and second anti-shake drive actuators 26.

Figure 9:
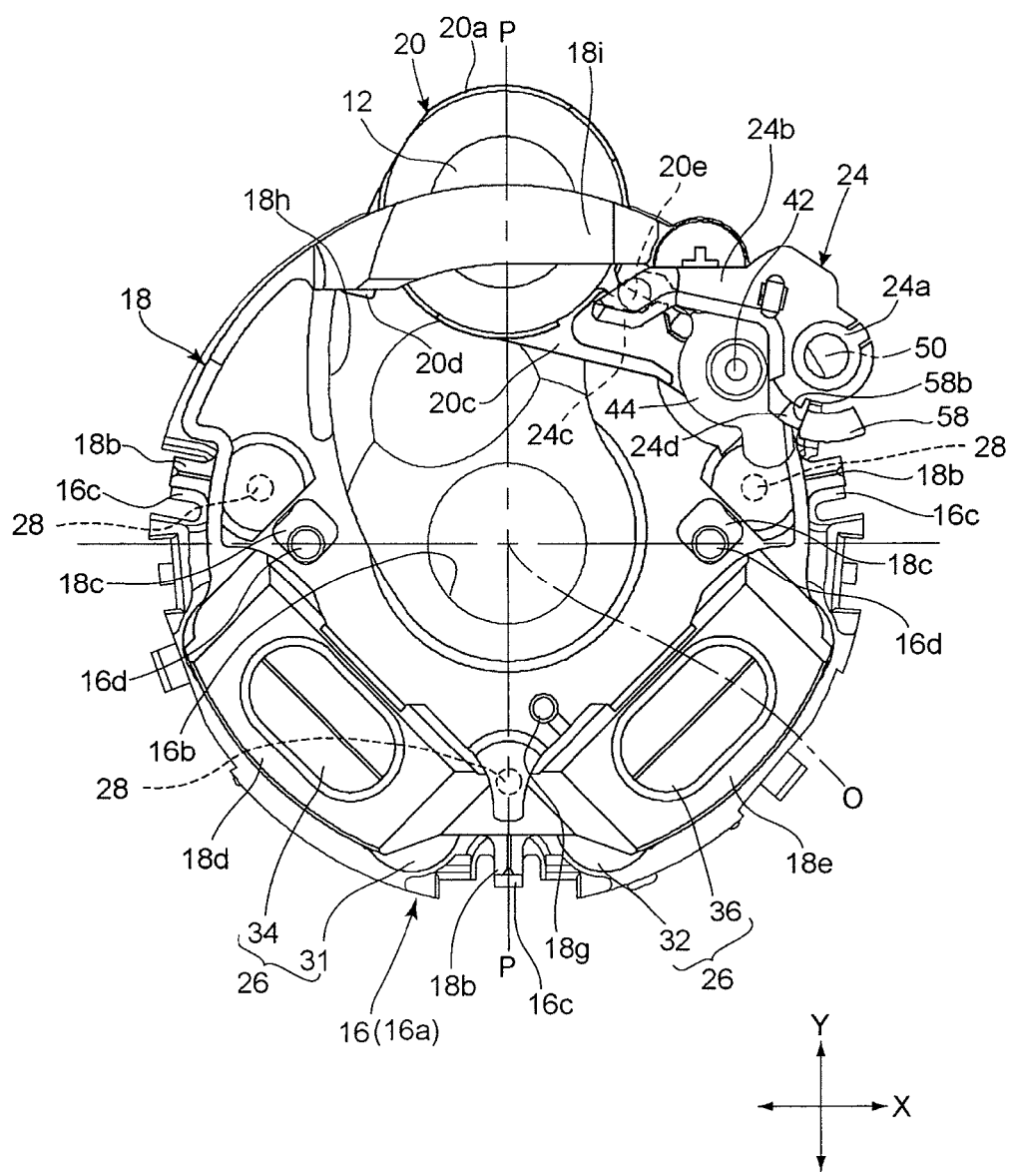
FIG. 9 is a rear elevational view of the portion of the anti-shake lens unit shown in FIG. 6 in a lens barrel accommodated state (fully-retracted state) of the lens barrel.

Additionally, as shown in FIG. 9, the two movement limit projections 16d of the shutter unit 16 and the two movement limit holes 18c of the anti-shake frame 18, in which the two movement limit projections 16d are loosely engaged, are symmetrically arranged on opposite sides of the Y-direction straight line (the Y-axis) in the vicinity of the X-direction straight line (the X-axis). Namely, two movement limiters which consist of the two movement limit projections 16d and the two movement limit holes 18c are arranged in the vicinity of two of the aforementioned three groups of rolling-motion structures so as to be associated therewith, respectively. Such an arrangement of the two movement limiters for the anti-shake frame 18 in association with the three groups of rolling-motion structures and the first and second anti-shake drive actuators 26 makes it possible to limit the moving range of the anti-shake frame 18 more securely and efficiently.

Operations of the anti-shake lens unit 10 that has the above described structure will be discussed hereinafter. In a ready-to-photograph state shown in FIGS. 6 through 8, the insertable/removable frame 20 is held at the insertion position by the biasing force of the insertable/removable frame biasing spring 46, and the center (optical axis) of the insertable/removable image-stabilizing lens 12 is coincident with the photographing optical axis O. In this ready-to-photograph state, deviations (image shake) of an object image focused on an image plane can be reduced by driving the insertable/removable image-stabilizing lens 12 in directions orthogonal to the photographing optical axis O by the anti-shake drive actuator 26 in accordance with the direction and magnitude of vibrations applied to the lens barrel (i.e. to the photographing optical system). More specifically, the angular velocities of the lens barrel are detected by gyro sensors, and are time-integrated to determine a moving angle, and subsequently, from this moving angle, the moving amounts of the image on the focal plane in the X-axis direction and in the Y-axis direction are calculated while the driving amounts and the driving directions of the insertable/removable image-stabilizing lens 12 (the anti-shake frame 18) for the respective axial directions are calculated in order to cancel out the image shake. Subsequently, the passage of current through each of the coils 31 and 32 is controlled in accordance with these calculated values. Thereupon, the anti-shake frame 18 is moved while being supported by the three guide balls 28 at the three ball contact surfaces 18a. When the anti-shake frame 18 is driven to perform an anti-shake driving operation, the insertable/removable frame 20 is held in the insertion position, in which the stopper contact portion 20d is made to contact the stopper 18g, so that the anti-shake frame 18 and the insertable/removable frame 20 (the insertable/removable image-stabilizing lens 12) integrally move.

In a ready-to-photograph state, it is possible to calibrate the position detection sensors 38 and 40 by utilizing information on the positions of movement limits of the anti-shake frame 18, where each of the two movement limit projections 16d comes into contact with the inner wall of the associated movement limit hole 18c of the anti-shake frame 18. The direction of action of each of the two driving forces F1 and F2, which are respectively generated by a combination of the coil 31 and the permanent magnet 34 and a combination of the coil 32 and the permanent magnet 36, intersects both the X-axis direction and the Y-axis direction at an angle of approximately 45 degrees. Accordingly, the movement limits of each movement limit hole 18c in the X-axis direction relative to the associated movement limit projection 16d (defined by the each laterally opposed corner (end) of each movement limit hole 18c coming into contact with the associated movement limit projection 16d) can be used as reference positions for driving the anti-shake frame 18 in the X-axis direction by the anti-shake drive actuator 26, and the movement limits of each movement limit hole 18c in the Y-axis direction relative to the associated movement limit projection 16d (defined by each vertically opposed corner (end) of each movement limit hole 18c coming into contact with the associated movement limit projection 16d) can be used as reference positions for driving the anti-shake frame 18 in the Y-axis direction by the anti-shake drive actuator 26. A practical anti-shake driving range of the anti-shake frame 18 in a ready-to-photograph state is defined within a range in which each movement limit projection 16d does not come into contact with the inner wall of the associated movement limit hole 18c.

When the lens barrel moves from a ready-to-photograph state to the lens barrel accommodated state, the anti-shake lens unit 10 (the linear moving ring 14) is moved rearward in the optical axis direction by a motor (not shown) for driving the whole lens barrel forward and rearward, and the pressing-force receiving part 24d of the removal drive lever 24 which retracts with the linear moving ring 14 comes in contact with the end-face cam 58a of the insertion/removal control-projection 58. A further rearward movement of the linear moving ring 14 causes the pressing-force receiving part 24d to be pressed by the end-face cam 58a. Thereupon, a component force is produced from the retracting force of the linear moving ring 14, so that the removal drive lever 24 is rotated against the biasing force of the removal drive lever biasing spring 54 to thereby cause the removal pressing portion 24c to come into contact with the pressing-force receiving part 20e. The insertable/removable frame 20 is acted upon by a biasing force of the insertable/removable frame biasing spring 46 toward the insertion position as described above, and the removal drive lever 24 with the removal pressing portion 24c in contact with the pressing-force receiving part 20e presses the insertable/removable frame 20 toward the removed position from the insertion position against the biasing force of the insertable/removable frame biasing spring 46. In addition, the anti-shake frame 18, which supports the insertable/removable frame 20, is acted upon by the biasing force of the three extension springs 30 in a direction to press the three ball contact surfaces 18a against the three guide balls 28. Namely, the insertable/removable frame biasing spring 46 and the extension spring 30 exert spring resistance on movements of the insertable/removable frame 20 and the anti-shake frame 18, respectively. Here the rotational resistance of the insertable/removable frame 20 that is caused by the insertable/removable frame biasing spring 46 is predetermined to be greater than the resistance to movement of the anti-shake frame 18 that is caused by the extension spring 30. Therefore, the pressing force acting on the insertable/removable frame 20 is transmitted to the anti-shake frame 18, thus causing the anti-shake frame 18 to move with the insertable/removable frame 20 toward the removed position before the commencement of rotation of the insertable/removable frame 20 toward the removed position. Subsequently, the anti-shake frame 18 is moved to the removal assisting position (shown in FIGS. 9 through 11), in which the end of the inner wall of each of the two movement limit holes 18c of the anti-shake frame 18 on the insertion position side in the Y-axis direction comes into contact with the associated movement limit projection 16d. Since the aforementioned practical anti-shake driving range of the anti-shake frame 18 in a ready-to-photograph state includes no points where the inner wall of each movement limit hole 18c comes into contact with the associated movement limit projection 16d as described above, the removal assisting position is positioned outside the anti-shake driving range. Immediately after the anti-shake frame 18 is prevented from moving beyond the removal assisting position after reaching the removal assisting position, the insertable/removable frame 20 is solely rotated from the insertion position to the removed position. Accordingly, the movement of the insertable/removable image-stabilizing lens 12 to the removed position thereof (shown in FIGS. 9 through 11) is performed as the result of a combination of the movement of the anti-shake frame 18 to the removal assisting position in the Y-axis direction and the rotation of the insertable/removable frame 20 to the removed position.

Figure 10:
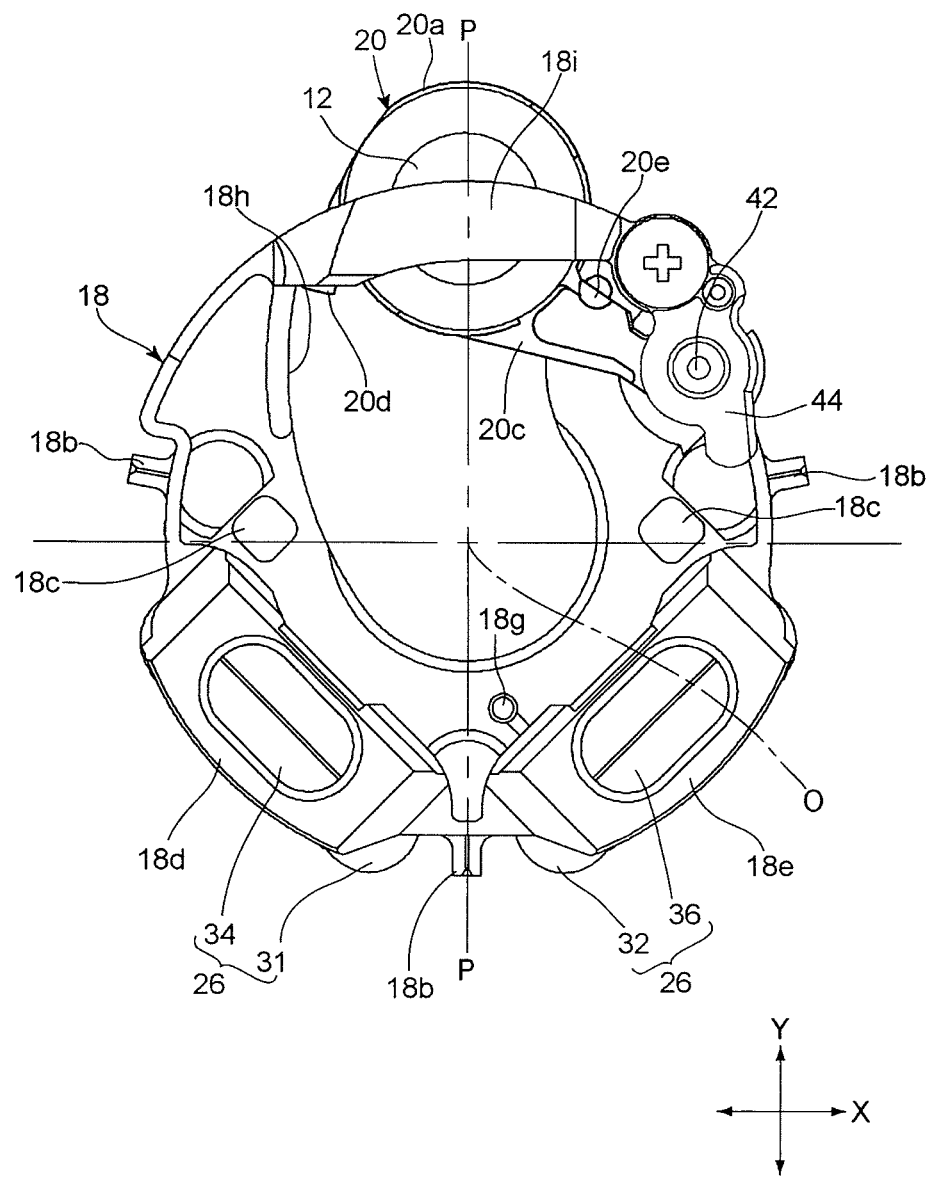
FIG. 10 is a rear elevational view of elements of the anti-shake lens unit shown in FIG. 9 which are driven during an image-stabilizing operation and the coils shown in FIG. 9.

The insertable/removable image-stabilizing lens 12 is removed from a position on an optical path (the photographing optical axis O) as shown in FIGS. 9 through 11 due to the movement of the anti-shake frame 18 to the removal assisting position and the rotation of the insertable/removable frame 20 to the removed position. A further rearward movement of the linear moving ring 14 causes the removed-lens holding surface 58b of the insertion/removal control-projection 58 to come in contact with the pressing-force receiving part 24d of the removal drive lever 24 (see FIG. 9), so that the insertable/removable frame 20 together with the removal drive lever 24 is held in the removed position by the insertion/removal control-projection 58 and is prevented from rotating toward the insertion position. Although not shown in the drawings, upon the lens barrel reaching the lens barrel accommodated state, a member positioned behind the insertable/removable image-stabilizing lens 12 (e.g., an optical element other than the insertable/removable image-stabilizing lens 12 which is positioned behind the insertable/removable image-stabilizing lens 12 in a ready-to-photograph state) enters an open space created by a removal of the insertable/removable image-stabilizing lens 12 (the cylindrical lens holder portion 20a). This structure makes it possible to reduce the length of the lens barrel in the optical axis direction in the lens barrel accommodated state of the lens barrel to a smaller degree than a type of lens barrel in which a plurality of optical elements are retracted and accommodated in line along the optical axis thereof.

Conversely, when the lens barrel moves from the lens barrel accommodated state to a ready-to-photograph state, the linear moving ring 14 is moved forward to thereby release the pressing force of the insertion/removal control-projection 58 against the removal drive lever 24, which causes the removal drive lever 24 to return to the position shown in FIG. 6 by the biasing force of the insertable/removable frame biasing spring 46. Thereupon, the biasing force of the insertable/removable frame biasing spring 46 causes the insertable/removable frame 20 to rotate from the removed position to the insertion position. In association with this rotation, the holding of the anti-shake frame 18 in the removal assisting position is also released, which brings the anti-shake frame 18 into a state where it can be driven by the anti-shake drive actuator 26. Thereafter, upon the lens barrel moving to a ready-to-photograph state, the aforementioned calibration operation for the position detection sensors 38 and 40 is performed.

In the above-described anti-shake lens unit 10, when the insertable/removable frame 20 is rotated from the insertion position to the removed position, the anti-shake frame 18 that supports the insertable/removable frame 20 is also moved to the removal assisting position, and accordingly, the amount of movement of the insertable/removable image-stabilizing lens 12 from the position on the photographing optical axis O to the removed position in the Y-axis direction is equal to a combination of a rotation of the insertable/removable frame 20 and a movement of the anti-shake frame 18, which makes it possible to remove the insertable/removable image-stabilizing lens 12 to the removed position by a greater amount than the case where only the insertable/removable frame 20 rotates. In other words, the swinging radius of the insertable/removable frame 20 can be made small with respect to the amount of movement of the insertable/removable image-stabilizing lens 12 from the position on the photographing optical axis O to the removed position, which makes it possible to achieve miniaturization of the removal drive mechanism.

In addition, in the lens barrel accommodated state of the lens barrel, the anti-shake frame 18 can be prevented from rattling because the insertable/removable frame 20 (the removal drive lever 24) applies a pressing force onto the anti-shake frame 18 with one end of the inner wall of each movement limit hole 18c of the anti-shake frame 18 in the Y-axis direction being in contact with the associated movement limit projection 16d.

Additionally, since the removal assisting position is set outside the practical anti-shake driving range of the anti-shake frame 18 in a ready-to-photograph state, even if a severe impact is applied to the lens barrel in the lens barrel accommodated state to thereby cause the guide balls 28 to dent the three ball contact surfaces 18a, the influence of the dents can be prevented from being exerted on the anti-shake drive performance in a ready-to-photograph state of the lens barrel.

Although the present invention has been discussed with reference to the above described embodiment, the present invention is not limited thereto. For instance, although the pair of anti-shake drive actuators 26 are positioned axisymmetrically with respect to the aforementioned Y-direction straight line (the Y-axis/the imaginary plane P) in a plane orthogonal to the photographing optical axis O, the pair of anti-shake drive actuators 26 do not necessarily need to be precisely positioned axisymmetrically with respect to the Y-direction straight line (the Y-axis/the imaginary plane P); the pair of anti-shake drive actuators 26 only need to be arranged on opposite sides of the Y-axis (the imaginary plane P), respectively. In addition, the support member for the anti-shake frame 18 can be any member other than the shutter unit 16. For instance, the anti-shake frame 18 can be movably supported by a flange formed integral with the inside of the linear moving ring 14.

Although the above described structure in which the insertable/removable frame 20 is pressed toward the removed position via the removal drive lever 24 is advantageous for miniaturization of the insertable/removable frame 20, an embodiment in which the insertable/removable frame 20 is directly pressed by an element corresponding to the insertion/removal control-projection 58 is also possible.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel having an image-stabilizing insertable/removable optical element provided in a photographing optical system, said lens barrel comprising:
   an advancing/retracting member which is movable in an optical axis direction of said photographing optical system, wherein said advancing/retracting member is moved between a ready-to-photograph state and a lens barrel accommodated state in which no pictures are taken;
   an anti-shake frame supported by said advancing/retracting member, said anti-shake frame being movable relative to said advancing/retracting member in a plane orthogonal to said optical axis;
   an insertable/removable frame which holds said image-stabilizing insertable/removable optical element and is supported by said anti-shake frame to be rotatable about a rotational shaft that is parallel to said optical axis between an insertion position at which said image-stabilizing insertable/removable optical element is positioned on said optical axis and a removed position at which said image-stabilizing insertable/removable optical element is removed from said optical axis;
   an anti-shake drive mechanism which drives said anti-shake frame to perform an image-stabilizing operation in accordance with vibrations applied to said photographing optical system; and
   a removal drive mechanism which moves said insertable/removable frame between said insertion position and said removed position when said advancing/retracting member moves between said ready-to-photograph state and said lens barrel accommodated state, respectively,
   wherein said anti-shake drive mechanism comprises a first anti-shake drive actuator and a second anti-shake drive actuator, each of which includes a coil that is supported by one of said advancing/retracting member and said anti-shake frame and a permanent magnet that is supported by the other of said advancing/retracting member and said anti-shake frame, respectively,
   wherein said first anti-shake drive actuator and said second anti-shake drive actuator are both positioned on the opposite side of said insertion position of said image-stabilizing insertable/removable optical element from said removed position of said image-stabilizing insertable/removable optical element, and are respectively positioned on opposite sides of a straight line which connects a center point of said image-stabilizing insertable/removable optical element in said insertion position and said center point of said image-stabilizing insertable/removable optical element in said removed position, wherein said center point of said image-stabilizing insertable/removable optical element is positioned on said optical axis when in said insertion position, and
   wherein directions of driving forces respectively produced by said first anti-shake drive actuator and said second anti-shake drive actuator when said coils thereof are energized are at right angles to each other.

2. The lens barrel according to claim 1, wherein said advancing/retracting member comprises a first group of three flat surfaces orthogonal to said optical axis,
   wherein said anti-shake frame comprises a second group of three flat surfaces orthogonal to said optical axis which face said first group of three flat surfaces, respectively,
   wherein said lens barrel further comprises:
      three guide balls installed between said first group of three flat surfaces and said second group of three flat surfaces, respectively, and
      at least one spring installed between said advancing/retracting member and said anti-shake frame to bias said advancing/retracting member and said anti-shake frame in directions to approach each other to make said first group of three flat surfaces and said second group of three flat surfaces press against said three guide balls, respectively.

3. The lens barrel according to claim 2, wherein one of said three guide balls is positioned between said first anti-shake drive actuator and said second anti-shake drive actuator and lies on an extension of said straight line, and
   wherein the other two of said three guide balls are positioned on opposite sides of said straight line, respectively, at bilaterally symmetrical positions, with respect to said image-stabilizing insertable/removable optical element at said insertion position of said insertable/removable frame.

4. The lens barrel according to claim 1, further comprising two movement limiters arranged on opposite sides of said straight line, respectively, to limit a moving range of said anti-shake frame, each of said movement limiters comprising:
   a projection which projects from one of said advancing/retracting member and said anti-shake frame in said optical axis direction; and
   a hole which is formed in the other of said advancing/retracting member and said anti-shake frame so that said projection is loosely fitted in said hole.

* * * * *